(12) United States Patent
Rouse

(10) Patent No.: US 6,648,578 B1
(45) Date of Patent: Nov. 18, 2003

(54) TRAILER AND LIFT ASSEMBLY FOR SAME

(76) Inventor: Richard W. Rouse, 28544 E. River Bay Dr., Waterford, WI (US) 53185

(*) Notice: Subject to any disclaimer, the term of this patent is extended or adjusted under 35 U.S.C. 154(b) by 0 days.

(21) Appl. No.: 10/108,836

(22) Filed: Mar. 28, 2002

(51) Int. Cl.[7] .................................................. B60P 3/10
(52) U.S. Cl. ....................... 414/482; 414/471; 414/483; 414/812; 280/414.1
(58) Field of Search ................................ 414/471, 482, 414/483, 495, 812; 280/414.1

(56) References Cited

U.S. PATENT DOCUMENTS

| | | | | |
|---|---|---|---|---|
| 4,395,185 A | * | 7/1983 | Whaley | 414/483 |
| 4,417,841 A | * | 11/1983 | Chadwick | 414/346 |
| 4,673,328 A | * | 6/1987 | Shiels | 414/471 |
| 4,902,188 A | * | 2/1990 | Page | 414/495 |
| 5,165,706 A | * | 11/1992 | Fond | 280/414.1 |
| 5,275,526 A | * | 1/1994 | Moseley | 414/495 |
| 5,288,197 A | * | 2/1994 | Harris | 414/495 |
| 5,308,213 A | * | 5/1994 | Gilbertson | 414/482 |
| 5,333,340 A | * | 8/1994 | Moseley | 14/72.5 |
| 5,405,236 A | * | 4/1995 | Sundstrom et al. | 414/495 |
| 5,630,693 A | * | 5/1997 | Sobina | 414/495 |
| 5,749,589 A | * | 5/1998 | Hopkins et al. | 280/47.34 |
| 6,113,130 A | * | 9/2000 | Saulce | 280/656 |
| 6,357,990 B1 | * | 3/2002 | Moseley | 414/495 |
| 6,409,455 B2 | * | 6/2002 | Moseley | 414/495 |
| 2001/0011802 A1 | * | 8/2001 | Meabon | 280/47.18 |
| 2001/0045718 A1 | * | 11/2001 | Boirum | 280/47.26 |

FOREIGN PATENT DOCUMENTS

| | | | |
|---|---|---|---|
| EP | 245104 | * | 11/1987 |
| GB | 2133378 | * | 7/1984 |

OTHER PUBLICATIONS

Picture, http://www.freeway–sports.com/bx.jpg (date unknown).
Picture, http://www.freeway–sports.com/bx120.jpg (date unknown).
Freeway Sports Center, *Hooiser Pontoon Trailers*, http://www.freeway–sports.com/BX.htm (date unknown).

* cited by examiner

Primary Examiner—James W. Keenan
(74) Attorney, Agent, or Firm—Boyle Fredrickson Newholm Stein & Gratz S.C.

(57) ABSTRACT

A trailer includes a tongue, an upper frame, a lower frame coupled to the upper frame via a plurality of arms, and a lift assembly. The lift assembly includes 1) a hydraulic ram and 2) a hydraulic pump that is operatively connected to the hydraulic ram. The hydraulic ram raises the upper frame to a raised position when the hydraulic ram is retracted, and lowers the upper frame to a lowered position when the hydraulic ram is extended. The lift assembly is configured to be removably attachable to a trailer for retrofit operations, lift assembly replacement, or lift assembly reuse upon trailer sale or disposal. Also included is a method of raising and lowering a vehicle.

15 Claims, 6 Drawing Sheets

TRAILER AND LIFT ASSEMBLY FOR SAME

BACKGROUND OF THE INVENTION

1. Field of the Invention

The invention relates to trailers, and more particularly to trailers having hydraulic lift assemblies.

2. Description of the Related Art

Trailers are used to haul a variety of items, e.g., cars, all terrain vehicles, and boats. Boat trailers include both float trailers and cantilevered trailers. Float trailers do not actively move boats. Instead, boats are loaded on and unloaded from float trailers by backing the trailer down a boat ramp into enough water to float the boat onto and off the trailer.

Cantilevered trailers actively raise and lower boats with, e.g., a hydraulic lift system. Cantilevered trailers can raise and lower boats into and out of the water typically by a winch and pulley lift assembly or by a hydraulic lift assembly. A cantilevered trailer with winch and pulley lift assembly requires manual operation of the winch and pulley system to raise and lower the trailer, fatiguing an operator when multiple lifts are required. This problem particularly affects people, such as boat dealers, that raise and lower many boats a day. In addition, informed people find raising and lowering even a single boat difficult. In addition, trailers with winch and pulley systems take time to operate the winch.

Furthermore, winch and pulley systems are permanently mounted to the trailers, requiring the replacement of the entire trailer when a problem occurs with the winch and pulley system and, conversely, disposal of the winch and pulley system when the trailer is worn out.

Cantilevered trailers equipped with hydraulic lift assemblies are advantageous over those equipped with winch and pulley systems in that they are mechanized. A typical conventional trailer with hydraulic lift assembly has a hydraulic ram positioned between an upper and a lower frame of the trailer. Such positioning of the hydraulic ram has several drawbacks. For example, a hydraulic pump typically is located far from the hydraulic ram, requiring the use of long hydraulic hoses to connect the pump to the ram. Furthermore, when the hydraulic ram is positioned between the two frames of the trailer, the hydraulic ram is submerged when the trailer is backed down a ramp into water. Such submersion causes problems related to corrosion.

Thus, there is a need for a trailer that has a hydraulic lift assembly that avoids at least some of the problems noted above. In particular, the trailer should have a hydraulic ram that is kept out of the water during use. The trailer should have hydraulic conduits of a sufficiently short length such that they do not tangle with each other or other components of the trailer. Furthermore, there is a need for a hydraulic lift system that can be easily transferred from one trailer to another and/or that can be easily retrofitted onto an existing trailer.

SUMMARY OF THE INVENTION

The invention, which is defined by the claims set out at the end of this disclosure, is intended to solve at least some of the problems noted above. It is also applicable in applications other than boat hauling, in which there is a need to raise and lower vehicles and to haul vehicles.

In accordance with a first aspect of the invention, a trailer includes a tongue, an upper frame, a lower frame coupled to the upper frame via a plurality of arms and from which the tongue extends, and a lift assembly. The lift assembly includes 1) a hydraulic ram and 2) a hydraulic pump that is operatively connected to the hydraulic ram. The hydraulic ram raises the upper frame to a raised position when the hydraulic ram is retracted, and lowers the upper frame to a lowered position when the hydraulic ram is extended.

A lift assembly is provided that includes a ram stand, a hydraulic ram that is mounted on the ram stand, and a hydraulic pump that is operatively connected to the hydraulic ram. The lift assembly is configured to be attachable to a upper frame of a trailer. The hydraulic ram lifts the upper frame of the trailer to a raised position when the hydraulic ram is retracted, and lowers the upper frame to a lowered position when the hydraulic ram is extended.

Also provided is a method of raising and lowering a trailer. In the method, an upper frame of the trailer is raised by retracting a hydraulic ram that is connected to the upper frame. The upper frame of the trailer is lowered by extending the hydraulic ram.

DETAILED DESCRIPTION OF THE PREFERRED EMBODIMENT

1. Resume

Figure 1:
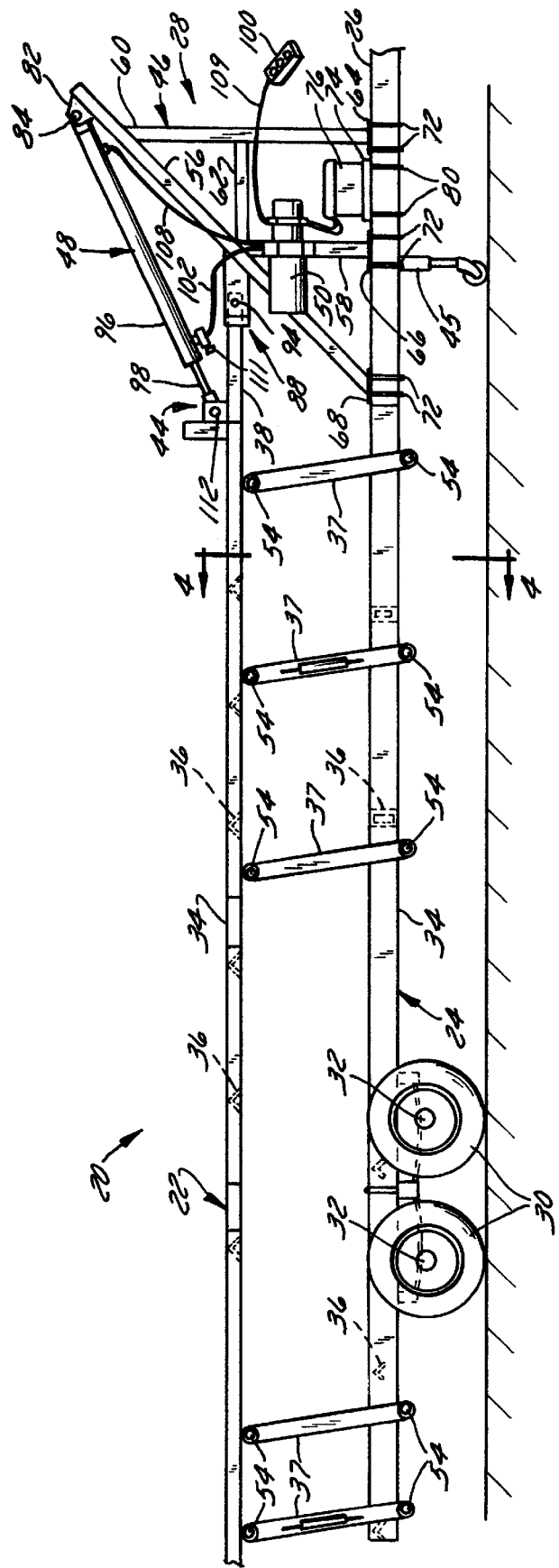
FIG. 1 a partial side view of a trailer made in accordance with a preferred embodiment of the invention, with the trailer in a raised position.

Pursuant to the invention, a trailer is provided with a removable hydraulically powered lift assembly. The trailer includes an upper frame, a lower frame, a tongue, and the lift assembly. The lift assembly includes a hydraulic ram that raises the upper frame of the trailer to a raised position when the hydraulic ram is retracted and lowers the upper frame to a lowered position when the hydraulic ram is extended. Hence, the hydraulic ram pulls the upper frame of the trailer from the top rather than pushing the upper frame of the trailer from below as in traditional trailers with hydraulic lift assemblies. The lift assembly also includes a ram stand constructed so as to permit the lift assembly to be transferable to another trailer, retrofittable onto an existing trailer, and/or replaceable with, e.g., a standard winch.

2. A Preferred Embodiment of the Trailer

Referring first FIGS. 1–4, the trailer 20 described herein can be used to haul vehicles. The term "vehicles" as used herein includes, but is not limited to, boats, cars, trucks, all-terrain vehicles, snowmobiles, airplanes, or other vehicles. A preferred embodiment of the invention will be described in use to transport a boat. This example is not intended to limit the invention to trailers usable only with boats.

The trailer 20 includes an upper frame 22, a lower frame 24, a tongue 26, and a lift assembly 28. The trailer 20 also includes wheels 30, which are supported on an axle 32. In the illustrated embodiment, the trailer 20 includes four wheels 30 and two axles 32, which are spaced apart such that the two axles 32 are located relatively close to each other. The axles 32 preferably are located about two-thirds of the way down the lower frame 24 from a front end of the trailer 20. A vehicle, such as a pontoon boat, can be positioned on the upper frame 22 such that the vehicle can be hauled, launched into water, and retrieved from the water or deposited on land for storage or repair.

Figure 2:
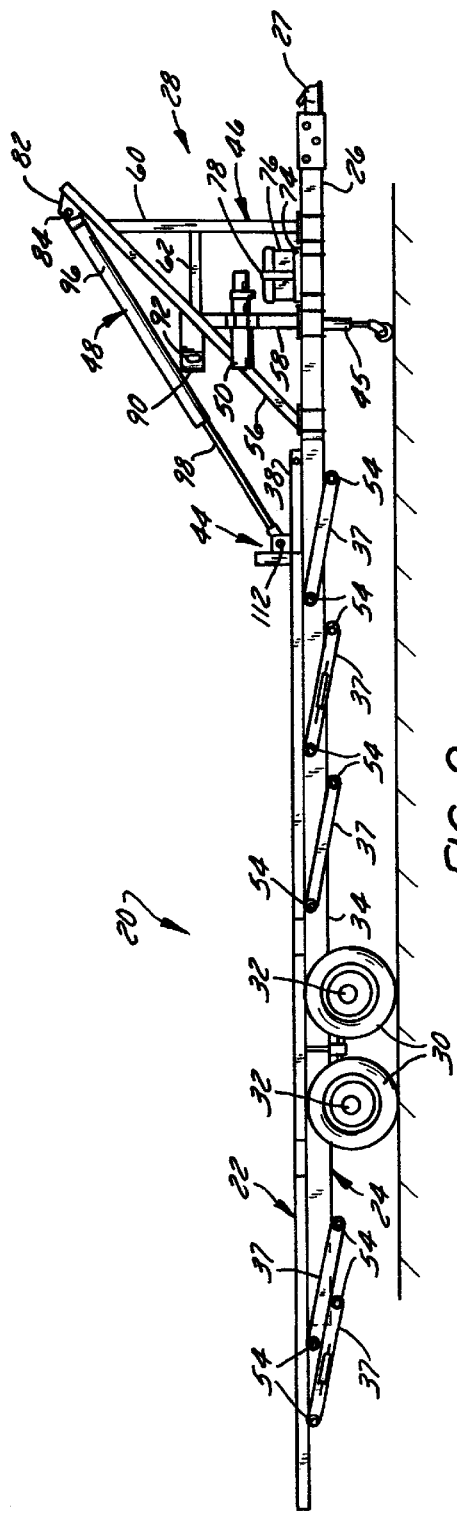
FIG. 2 a side elevation view of the trailer of FIG. 1, with the trailer in a lowered position.
Figure 3:
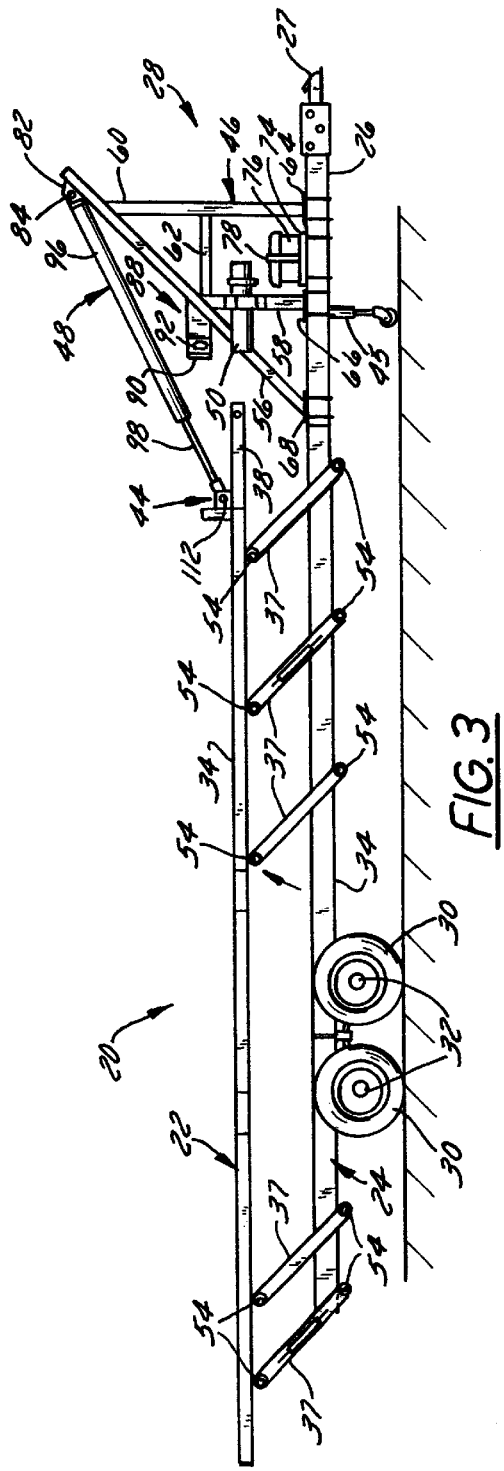
FIG. 3 a side elevation view of the trailer of FIGS. 1 and 2 with a preferred embodiment of the invention, with the trailer in a raised position.
Figure 4:
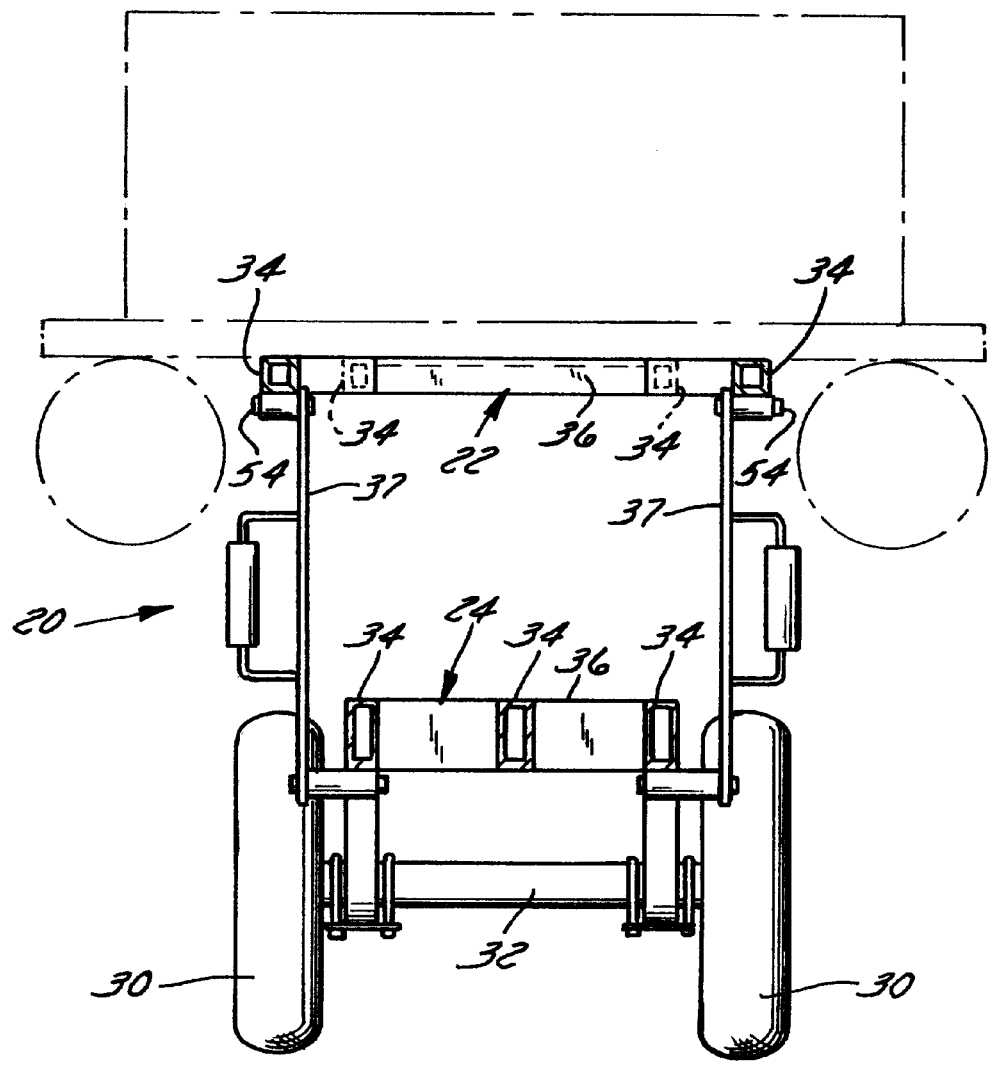
FIG. 4 is a sectional end view along line 4—4 of FIG. 1, showing a pontoon boat in phantom.

Each of the upper and lower frames 22 and 24 includes a series of longitudinal and lateral bars 34 and 36 that are welded or otherwise affixed to one another in a standard fashion. The upper frame 22 is connected to the lower frame 24 via pivot arms 37, which are spaced about a periphery of the upper and lower frames 22 and 24. The pivot arms 37 are attached at a bottom of the upper and lower frames 22 and 24 in a parallelogram linkage with pins 54. Each pin 54 is received in a mount (not shown) that has a bushing (not shown) that supports the pin 54. In a preferred embodiment, three sets of pivot arms 37 are employed behind the wheels 30 (although only two sets are shown in the drawings), and three sets of pivot arms 37 are used in front of the wheels 30. The pivot arms 37 pivotably move the upper frame 22 backwardly over the lower frame 24 in a cantilevered manner as shown in FIGS. 2 and 3. A horizontal extension 38 extends from a front side of the upper frame 22. The horizontal extension 38 includes an opening 40. The upper frame 22 also includes a frame portion 42 of a clevis 44 at a front, top side of the upper frame 22.

The tongue 26 extends outwardly from a center front of the lower frame 24. The tongue 26 permits connection of the trailer 20 to a towing vehicle (not shown) via a hitch 27. Other conventional components, such as chains (not shown) and electrical couplings (not shown) for powering, e.g., lights (not shown) on the trailer 20 can be carried on the tongue 26. A conventional jack 45 can be used to support the tongue 26 on the ground in a horizontal position when the trailer 20 is removed from the towing vehicle.

Figure 5:
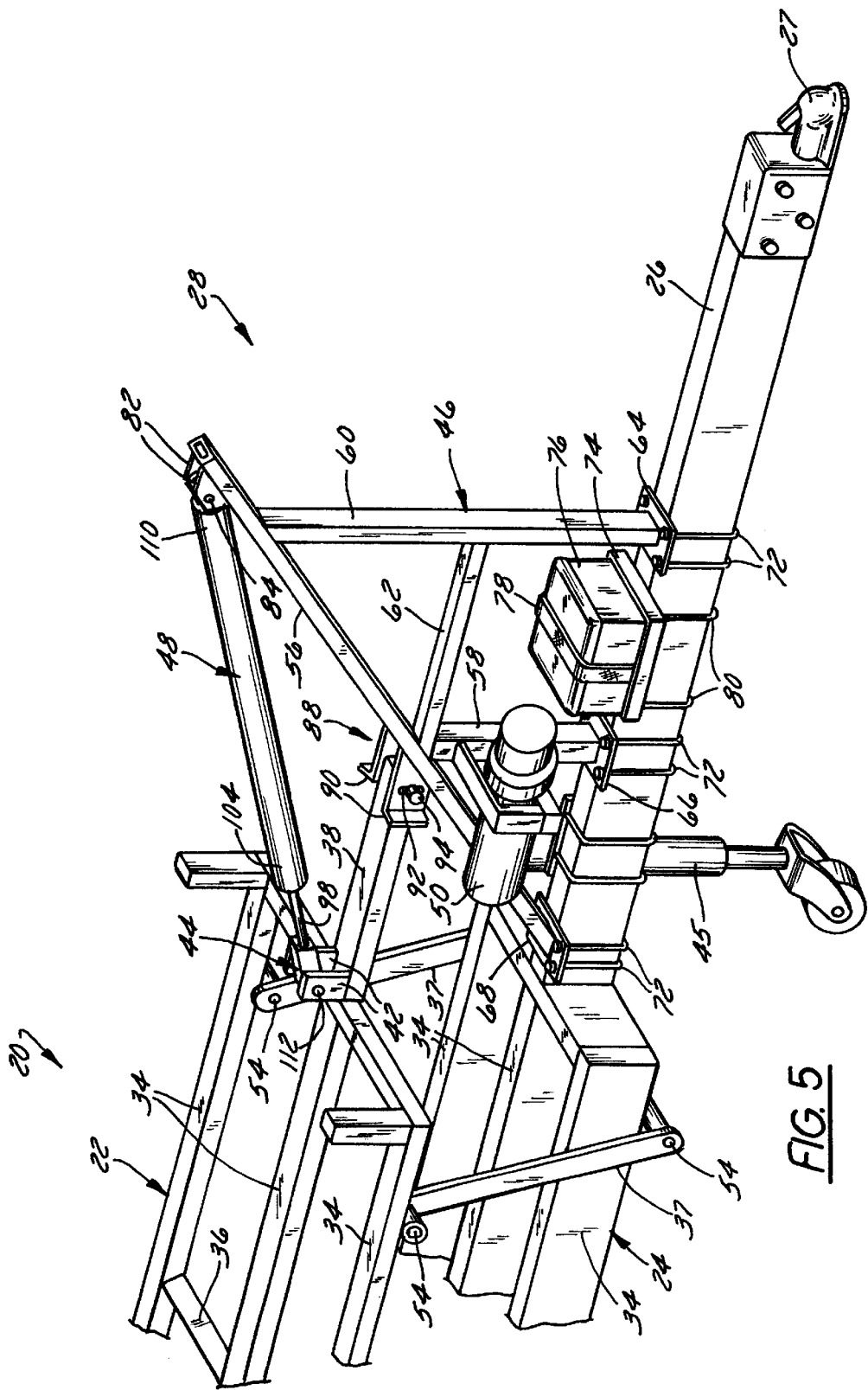
FIG. 5 a partial perspective view of the trailer of FIGS. 1 and 3, showing the lift assembly of the trailer with the trailer in a raised position.
Figure 6:
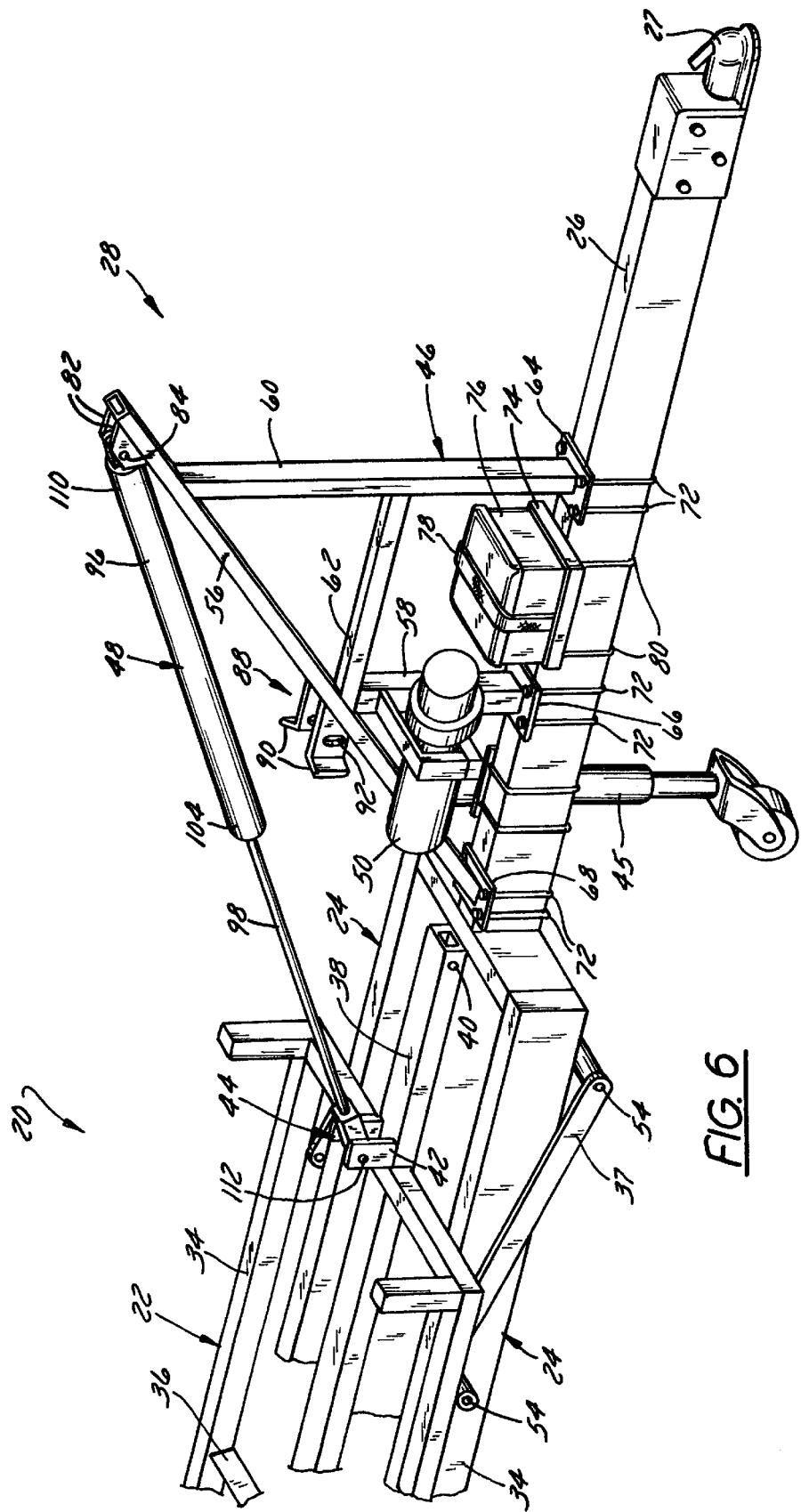
FIG. 6 corresponds to FIG. 5 and shows the trailer in a lowered position.

Referring now to FIGS. 5 and 6, the lift assembly 28 includes a ram stand 46, a hydraulic ram 48, a hydraulic pump 50, and a motor (not shown) are mounted. The ram stand 46 supports the ram 48 and overlies the pump 50, the motor, and a power source 76. When the hydraulic ram 48 is retracted, the pivot arms 37 are preferably generally perpendicular to the ground as is shown in FIG. 1 Conversely, when the ram 48 is extended, the pivot arms assume a more horizontal position as shown in FIG. 2.

Figure 7:
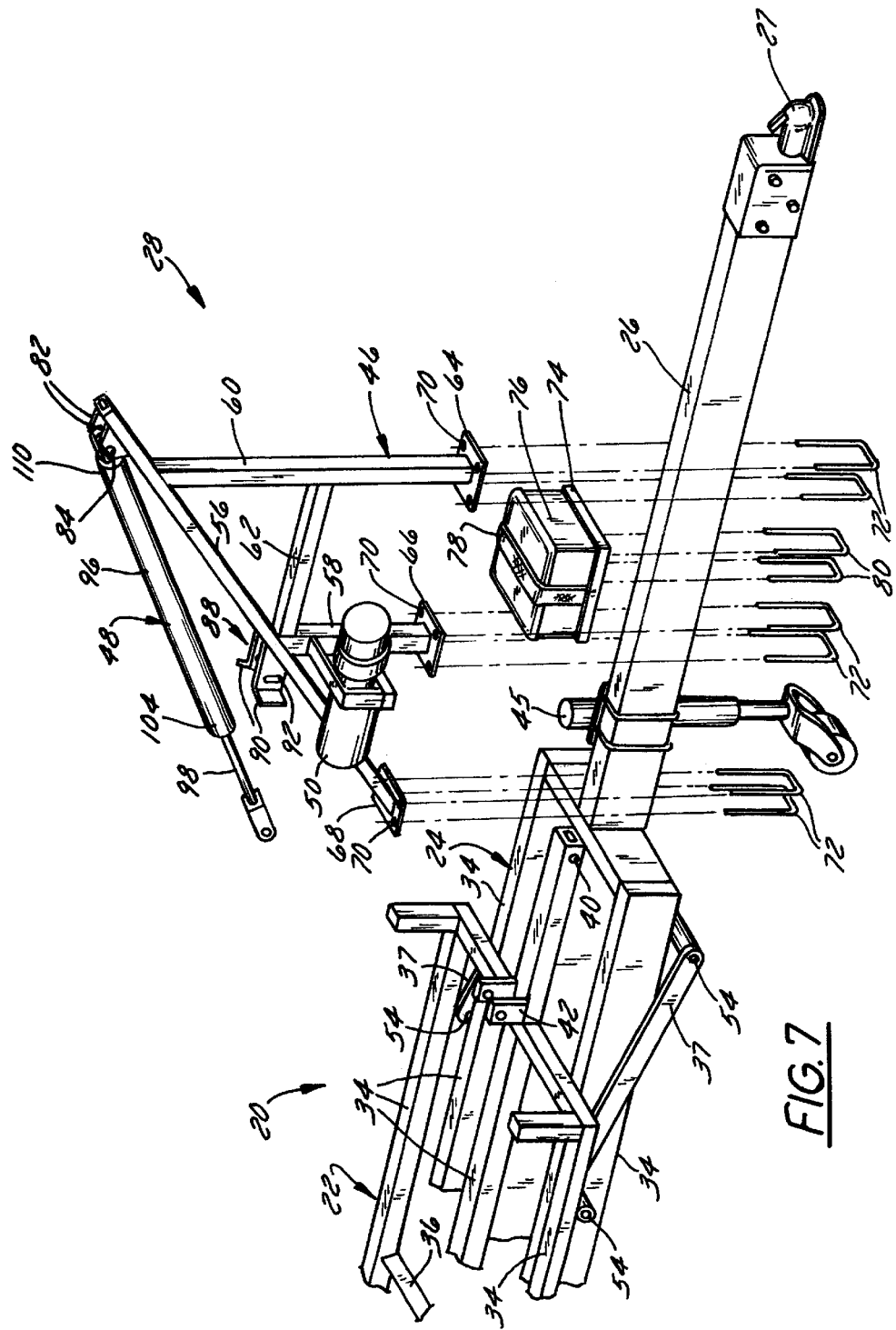
FIG. 7 an exploded view of the lift assembly and the trailer, showing the lift assembly detached from the trailer.

Referring to FIGS. 5–7, the ram stand 46 includes a diagonal brace 56, first and second upright supports 58 and 60 that extend from and support the diagonal brace 56. In a preferred embodiment, the first and second upright supports 58 and 60 are a short support 58 and a long support 60, with the short support 58 positioned rearwardly from the tall support 60. Additionally, the ram stand 46 preferably includes a horizontal brace 62 extend between and welded or otherwise affixed to short support 58 and long support 60.

In addition, the ram stand 46 includes a front baseplate 64, a middle baseplate 66, and a rear base plate 68. The front baseplate 64 is affixed to a bottom end of the long support 60, the middle baseplate 66 is affixed to a bottom end of the short support 60, and the rear baseplate 68 is affixed to the bottom of the diagonal brace 56. Specifically, the lower end of the diagonal brace 56 is attached to the rear baseplate 68, preferably at an angle of about 45 degrees from the tongue 26. Each baseplate 64, 66, and 68 includes two sets of openings 70 for receiving two U-bolts 72. A U-bolt 72 is inserted into each set of openings 70 from an underside of the tongue 26 and secured therein with nuts (not shown) to clamp the baseplates 64, 66, and 68 in place.

A tray 74 supports the power source 76 that supplies power to the motor. Preferably, the power source 76 is a 12-volt battery. The power source 76 can be secured to the tray 74 with a strap 78 that can be secured to a mount (not shown) on the tray 74. The tray 74 includes two sets of openings (not shown) for receiving two U-bolts 80, with four openings on the corners of the tray 74. A U-bolt 80 is inserted into each of the two openings from an underside of the tongue 26 to clamp the tray 74 in place. The U-bolts 72 used in conjunction with baseplates 64, 66, and 68 and the tray 74 allow for easy attachment and detachment of the lift assembly 28 from the rest of the trailer 20, as is described in detail below and as is illustrated in FIG. 7.

At its upper end, the diagonal brace 56 includes a first mount 82, which preferably is a yoke 82 on which one end of the hydraulic ram 48 is mounted. Preferably, a bolt 84, such as a ¾ inch hardened bolt, is used to secure the ram 48 to the first yoke 82. The hydraulic ram is a bi-direction or two-stroke ram that includes a barrel 96 and a rod 98 disposed in the barrel 96. A mount end 110 is pinned to the first yoke 82. A rod end 104 is pinned on the upper frame 22. The preferred size of the hydraulic ram 48 depends upon the weight of the vehicle being raised and lowered. For lifting most pontoon boats, the hydraulic ram 48 preferably has a diameter of between about 2 inches and about 2 ½ inches. Preferably, when the upper frame is in a lower position, the hydraulic ram 48 and the diagonal brace 56 form an acute included angle no greater than about 17° and more preferably, about 10°. This angle minimizes creation of bending moments in the diagonal brace 56 by transmitting substantially all or most of the ram force to the lower frame 24 through the diagonal brace 56. Additionally, this minimizes bending moments in the upright supports 58 and 60.

The diagonal brace 56 includes a second yoke 88 that is attached, such as by welding, at or near the intersection of the short support 58 and the horizontal brace 62. The second yoke 88 is attached to a rear side of the diagonal brace 56. In a preferred embodiment, the second yoke 88 includes two plates 90 with openings 92. The second yoke 88 is configured and dimensioned to receive the horizontal extension 38 of the upper frame 22 when the upper frame 22 is lifted to a raised position. When the horizontal extension 38 is received in the second yoke 88, a fastener such as a pin 94 can be inserted through the openings 92 in the second yoke 88 and the horizontal extension 38 to secure the upper frame 22 in a raised position for transport, as is shown in FIG. 5. The pin 94 is removed when the upper frame is raised and lowered.

The hydraulic ram 48 raises the upper frame 22 to a raised position when the hydraulic ram 48 is retracted (FIG. 5) and lowers the upper frame 22 to a lowered position when the hydraulic ram 48 is extended (FIG. 6). Hence, the hydraulic ram 48 pulls the upper frame of the trailer 20 from the top rather than pushing the upper frame 22 of the trailer 20 from below as in traditional trailers with hydraulic lift assemblies. The upper frame 22 is lowered to launch a boat. Using a hydraulic ram 48, as opposed to an electric motor, to lower boats advantageously extends the life of the battery 76.

The hydraulic pump 50 preferably is mounted on the short upright support 58 of the ram stand 46, such as with two bolts (not shown). Referring back to FIG. 1, the hydraulic pump 50 is a DC powered pump 50 that is powered by the motor. The hydraulic pump 50 has an internal flow control valve (not shown) that permits the hydraulic ram 48 to be extended and retracted by operation of a directional control switch 100. A first conduit 102 couples the hydraulic pump 50 to the rod end 104 of the hydraulic ram 48. The first conduit 102 preferably is about 18 inches long. A second conduit 108 couples the hydraulic pump 50 to the mount end 110 of the hydraulic ram 48. The positioning of the first and second conduits 102 and 108 above or near the upper frame 22 and at a front end of the upper frame 22 advantageously locates them in a position where they are not submerged under water when the trailer 20 is used to launch or retrieve a boat. In addition, the length of the first and second conduits 102 and 108 assists in keeping them out of the water and preventing them from tangling with each other or with other components of the trailer 20.

The directional control switch 100 controls the supply of electric power from the motor to a solenoid-actuated valve (not shown) that is internal to the hydraulic pump 50. Activation of the directional control switch 100 changes direction of fluid flow to and from the hydraulic ram 48 to extend or retract the hydraulic ram 48. The directional control switch 100 of a preferred embodiment includes an UP button and a DOWN button (not shown). Still referring back to FIG. 1, wires 109 operatively couple the motor to the direction control switch 100 and to a solenoid (not shown). Preferably, the wires 109 have a length of at least about 15 feet such that a user of the trailer 20 can use the direction control switch 100 and actuate the UP and DOWN buttons from a towing vehicle.

In a preferred embodiment, a control valve 111, such as a flow restrictor 111 is included in the hydraulic system to regulate the flow of hydraulic fluid to the rod side 104 of the barrel. Preferably, the flow restrictor 111 is adjustable such that a user can select a desired flow regulation. The flow restrictor 111 limits the speed of the hydraulic ram 48 in the down cycle and is particularly useful when, for example, a heavy boat is being lowered on the trailer 20. The weight of a heavy boat, e.g., a 4,000 pound boat, can undesirably push hydraulic fluid more rapidly than the hydraulic pump 50 itself to undesirably drive the hydraulic ram 48 down exclusively under the weight of the boat. The flow restrictor 111 prevents this from occurring and, thus, avoids problems associated with lowering a heavy boat. In addition, if desired, a control valve may be included in the hydraulic system to regulate flow of hydraulic fluid to the mount side 110 of the barrel 96. In a preferred embodiment, a pressure relief valve (not shown) is included in the hydraulic system. Preferably, the pressure relief valve can be turned as high as 3,000 psi.

In a preferred embodiment, the lift assembly 28 is removable from the remainder of the trailer 20 by unfastening a bolt 112 of the clevis 44 and by unfastening the U-bolts 72 that secure the front, middle, and rear baseplates 64, 66, and 68 of the ram stand 46 and the U-bolts 80 that secure the tray 74, and by disconnecting the hydraulic system at the clevis 44, as is described above.

The removability of lift assembly 28 from the remainder of the trailer 20, permits, for example, a dealer to retain the lift assembly 28 after a trailer 20 or a boat and trailer 20 are sold. The buyer of the trailer 20 can substitute a traditional winch and pulley system for the lift assembly 28. The dealer then can attach the lift assembly 28 to another trailer.

3. Operation of the Trailer and Lift Assembly

Typical use of the trailer 20 and lift assembly 28 will now be described. When the trailer 20 is in raised position, as is shown in FIGS. 1 and 5, the trailer 20 can be used to transport a boat (shown in phantom in FIG. 4) during, for example, transportation to and from water. To launch a boat from the trailer 20, the trailer 20 is backed down a ramp towards the water. After the trailer 20 is sufficiently lowered into the water, the bolt is removed from the second yoke 88, and the lift assembly 28 is engaged to lower the boat into the water. In particular, the DOWN button on the directional control switch 100 is depressed to extend the hydraulic ram 48, which moves the upper frame 22 in a downward direction to lower the boat. The boat is then unsecured from the trailer 20 in a known fashion. FIG. 3 shows the trailer 20 in a partially lowered position, and FIG. 2 shows the trailer 20 in a fully lowered position. After the boat is launched, the trailer 20 can be removed from the water.

When retrieval of the boat is desired, the trailer 20 is lowered down the boat ramp preferably with the hydraulic ram 48 in an extended position and the upper frame 22 in a lowered position such as that shown in FIG. 2. The boat is moved toward the upper frame 22 and is placed thereon. The UP button on the directional control switch 100 is depressed to retract the hydraulic ram 48, which in turn lifts the upper frame 22 to a raised position (FIGS. 1 and 5) to raise the boat. The boat can be secured to the trailer 20 is a known fashion. The pin 94 is then inserted in the second yoke 88 to lock the frame 22 in its raised position, and the trailer 20 is removed from the water.

To remove the lift assembly 28 from the trailer 20, the U-bolts 72 and 80 are released by removing the nuts thereon. The four U-bolts 72 and 80 are then removed from the front, middle, and rear bases 64, 66, and 68 and from the tray 74 of the ram stand 46. In addition, the bolt 112 holding the clevis 44 is released by removing the nut thereon and sliding the bolt 112 through the openings of the clevis 44. The lift assembly 28 can then be removed from the trailer 20, such as by lifting it. If desired, a traditional winch and pulley system then can be inserted at the frame portion 42 of the clevis 44. Specifically, pulleys can be added to the frame portion 42 of the clevis 44 and a winch cable can be wrapped around the pulleys.

The lift assembly 28 can be transferred to another trailer by securing the U-bolts 72 and 80 around the tongue 26 of the new trailer and to the front, middle, and rear bases 64, 66, and 66 and to the tray 74 of the ram stand 46. Additionally, the frame portion 42 of the clevis 44 of the other trailer is attached to the rod end 104 of the hydraulic ram 48 of the lift assembly 28.

The trailer 20 and lift assembly 28 are also beneficial to those in poor health, who may not want to use a manual winch and pulley system, and to boat owners that live inland or off-water and need to launch boats frequently. Additionally, boat dealers benefit from the invention because they oftentimes haul and launch boats 10 to 20 times a day.

Using the lift assembly 28, a boat can be lifted in about 5 to 7 seconds, depending upon the weight of the boat and the setting of the flow control valve 111. For example, a boat weighing 4040 pounds can be lifted in roughly 7 seconds. This compares very favorable to the time required to use a traditional winch and pulley system, which typically is on the order of 45 seconds to a minute.

In addition, the lift assembly 28 and the trailer 20 including the lift assembly 28 last longer than those with traditional hydraulic lift systems because the conduits 102 and 108 and hydraulic ram 48 typically are not submerged in water during use because of their positioning. Additionally, the desirable length of the conduits 102 and 108 minimizes or prevents tangling thereof. Furthermore, the length of wires 109 leading to the direction control switch advantageously to permit a user to control the extension and retraction of the hydraulic ram 48 from inside a towing vehicle.

What is claimed is:

1. A trailer comprising:
   (A) an upper frame dimensioned and configured to transport a boat and launch the boat into a body of water;
   (B) a lower frame coupled to the upper fame via a plurality of arms, wherein the upper frame is located above the lower frame; and
   (C) a lift assembly that includes:
      (1) a hydraulic rain that includes a moving end and a stationary end that is located above the upper frame such that at least the stationary end of the hydraulic ram is positioned to remain out of the body of water when the boat is being launched; and
      (2) a hydraulic pump that is operatively connected to the hydraulic ram, wherein the hydraulic ram raises the upper frame to a raised position relative to the lower frame when the hydraulic ram is retracted, and lowers the upper frame to a lowered position relative to the lower frame when the hydraulic ram is extended.

2. A trailer of claim 1, wherein the hydraulic ram has a diameter between about 2 inches and about 2½ inches.

3. A trailer of claim 1, wherein the hydraulic pump is operatively connected to a rod side of a barrel of the hydraulic ram with a first conduit and to a mount side of the barrel with a second conduit.

4. A trailer of claim 3, wherein the first conduit has a length of about 18 inches, and the second conduit has a length of about 28 inches.

5. A trailer of claim 3, further comprising a flow restrictor that is configured to control flow of hydraulic fluid through the first conduit.

6. A trailer of claim 1, wherein the lift assembly is removably attached to the upper frame.

7. A trailer of claim 6, further comprising a clevis connection that removably attaches the lift assembly to the upper frame.

8. A trailer of claim 7, further comprising:
   a tongue extending outwardly from the lower frame; and
   fasteners that removably attach the lift assembly to the tongue.

9. A trailer of claim 1, wherein the lift assembly includes a ram stand having a diagonal brace, and wherein, when the upper frame is in a lowered position, the hydraulic ram and the diagonal brace meet at an acute included angle that is no greater than 17°.

10. A trailer of claim 9, further comprising a tongue extending outwardly from the lower frame, wherein the diagonal brace and the tongue meet at an angle of about 45 degrees.

11. A trailer of claim 1, further comprising a connection that is configured to lock the upper frame in the raised position.

12. A trailer of claim 1, wherein the trailer includes a front end that is connectable to a towing vehicle and a rear end opposite the front end,
   wherein the stationary end of the hydraulic ram is located in front of the movable end of the hydraulic ram, and
   wherein the hydraulic ram is configured to move the upper frame of the trailer forwardly towards the stationary end of the hydraulic ram when the hydraulic ram is retracted and move the upper frame of the trailer rearwardly away from the stationary end of the hydraulic ram when the hydraulic ram is extended.

13. A method comprising:
   (A) providing a trailer that includes
      (1) an upper frame that is dimensioned and configured to transport a boat,
      (2) a lower frame that is located below the upper frame, and
      (3) a hydraulic ram that is connected to the upper frame and that includes a stationary end;
   (B) raising the upper frame relative to the lower frame by retracting the hydraulic ram;
   (C) lowering the upper frame relative to the lower frame by extending the hydraulic ram; and
   (D) launching the boat into a body of water while at least the stationary end of the hydraulic ram remains out of the body of water.

14. A method of claim 13, further comprising, after step (D), removing the hydraulic ram from the trailer.

15. A method of claim 13, further comprising, after step (D), replacing the hydraulic ram with a winch and pulley system.

* * * * *

UNITED STATES PATENT AND TRADEMARK OFFICE
CERTIFICATE OF CORRECTION

PATENT NO.     : 6,648,578 B1
DATED          : November 18, 2003
INVENTOR(S)    : Richard W. Rouse It is certified that error appears in the above-identified patent and that said Letters Patent is hereby corrected as shown below:

Column 1,
Line 25, "informed" should read -- infirmed --.

Column 7,
Line 14, "fame" should read -- frame --;
Line 18, "rain" should read -- ram --.

Signed and Sealed this

Twenty-fourth Day of February, 2004

JON W. DUDAS
*Acting Director of the United States Patent and Trademark Office*